(12) United States Patent
Caravella (10) Patent No.: US 9,096,310 B2
(45) Date of Patent: Aug. 4, 2015

(54) FOUR-BAR VEHICLE CONTROLLER PROVIDING UP TO THREE INDEPENDENT OR COMBINED AXES OF CONTROL AND IMPROVED COCKPIT AND CONTROL INPUT ERGONOMICS

(76) Inventor: Joseph R. Caravella, Sherman Oaks, CA (US)

(*) Notice: Subject to any disclaimer, the term of this patent is extended or adjusted under 35 U.S.C. 154(b) by 912 days.

(21) Appl. No.: 13/136,397

(22) Filed: Aug. 1, 2011

(65) Prior Publication Data

US 2013/0031997 A1 Feb. 7, 2013

(51) Int. Cl.
*B64C 13/30* (2006.01)
*B64C 13/04* (2006.01)
*B64C 13/12* (2006.01)

(52) U.S. Cl.
CPC .............. *B64C 13/04* (2013.01); *B64C 13/30* (2013.01); *Y10T 74/20012* (2015.01)

(58) Field of Classification Search
USPC ............... 244/226, 229, 231, 232, 234, 99.3; 74/471 XY, 484 R, 485, 486, 488
See application file for complete search history.

(56) References Cited

U.S. PATENT DOCUMENTS

| | | | |
|---|---|---|---|
| 1,308,997 A | 7/1919 | Simmons | |
| 1,348,548 A | 8/1920 | De Dominicis et al. | |
| 1,536,515 A * | 5/1925 | Methlin | 244/231 |
| 1,855,988 A | 2/1931 | Ranasey | |
| 1,820,906 A * | 9/1931 | Bowers | 244/229 |
| 2,339,955 A * | 1/1944 | Shetler | 244/229 |
| 2,497,127 A | 7/1946 | Lecarme | |
| 2,455,584 A | 10/1946 | Jamison | |
| 2,566,526 A * | 9/1951 | Lecarme | 244/234 |
| 2,618,447 A * | 11/1952 | Lecarme | 244/231 |
| 4,114,843 A * | 9/1978 | Robinson | 244/229 |
| 4,819,896 A | 4/1989 | Narad | |
| 5,395,077 A | 3/1995 | Wolford | |
| 7,740,207 B2 * | 6/2010 | Ferraz | 244/234 |

* cited by examiner

*Primary Examiner* — Philip J Bonzell
*Assistant Examiner* — Marc Burgess
(74) *Attorney, Agent, or Firm* — The Mueller Law Office, P.C.

(57) ABSTRACT

The present invention pertains to a four-bar vehicle controller providing up to three independent or combined axes of control inputted via a yoke, steering wheel or other hand operated input means attached to an aft end of a control input shaft rotatably mounted to and extending rearwardly from an upper bar member of a four-bar assembly. The assembly is configurable to provide an operator a familiar steering experience and to improve cockpit ergonomics and control inputs. A forward end of the control input shaft is configurable to impart yaw control input or steering control input, or both, to one or more rotation transmission means coupled with yaw control linkage or steering control linkage, or both. The vehicle controller is configurable to control a vehicle equipped to operate in, or a simulator equipped to simulate operation in, one or more transportation modes, such as flight, ground-based, or water-based transportation modes.

11 Claims, 6 Drawing Sheets

FOUR-BAR VEHICLE CONTROLLER PROVIDING UP TO THREE INDEPENDENT OR COMBINED AXES OF CONTROL AND IMPROVED COCKPIT AND CONTROL INPUT ERGONOMICS

CROSS-REFERENCE TO A RELATED APPLICATION

This application is a Non-Provisional patent application which relies on U.S. Provisional Patent Application Ser. No. 61/400,417 filed Jul. 28, 2010, the disclosure of which is hereby incorporated by reference as if fully set forth herein.

FIELD OF THE INVENTION

The present invention relates to the field of 3-axis vehicle control mechanisms, for example, vehicle control means for controlling pitch, roll and yaw of an aircraft in flight. More particularly, the present invention pertains to: a four-bar controller equipped to provide up to three independent or combined axes of control inputted to an upper bar control input shaft; and, improved means for inputting all necessary directional control of a single transportation mode vehicle, or a vehicle configurable to operate in each of a plurality of transportation modes. The invention also pertains to ergonomically reducing cockpit clutter or complexity, and improving and/or simplifying the arrangement of controls made available within vehicle operating compartments configured for a single transportation mode, or for each of a plurality of transportation modes.

BACKGROUND OF THE INVENTION

A number of approaches in providing up to three independent axes vehicle control means, or making one or more improvements to an arrangement or layout of a vehicle controls, or both, have been attempted, dating back to an earlier part of the last century. Such efforts include vehicles equipped for operating in a single transportation mode or configurable to operate in more than one transportation mode. However very few of such efforts have been directed to ergonomically improving and simplifying the arrangement of controls made available within vehicle operating compartments incorporating a four-bar assembly providing up to three independent axes of control and configured to provide all necessary directional control of a single transportation mode vehicle, or a vehicle configurable to operate in each of a plurality of transportation modes. And of such few efforts, none have been ideal.

For example, in reference to Ranasey U.S. Pat. No. 1,855,988 FIG. 1, a four-bar like arrangement is shown incorporated onto the front lower third of a control stick (or mast 10) wherein a fourth bar is formed by the two lower pivot points at the centerlines of 15 and 48, and a yoke serving as a 3-axis control input means of this four-bar arrangement is rotatably mounted at the top of a vertically disposed control stick, all of which is directed solely to a controlling of a single transportation mode vehicle. However, as the control stick or mast 10 serves as a vertical bar of Ranasey's four-bar arrangement and merely extends upwardly to receive all control inputs, no ergonomic advantage, or increased operator room under the yoke, or aft of the control stick is provided or described. For example, since Ranasey's mast 10 serves as a control stick, and does not employ the present invention's rearwardly-extending control input shaft mounted to an upper 'bar' of a four-bar assembly, its placement will be akin to the placement of a typical control-stick of a vehicle (intended only for flight control). Accordingly, it being located and operable between one's thighs or knees makes it cumbersome to enter and exit a vehicle so configured, while additionally bearing little or no likeness to a vehicle controller incorporated into a vehicle control compartment configurable to also operate in an automobile-like manner. Consequently, in the flight mode, an operator well-acquainted with an automobile driving experience and the placement of the controls in such vehicle control compartments, would find little familiarity with, or analogous to, a typical driving experience in the dynamically-tilting control yoke of the Ranasey approach.

In contrast, the present invention provides a control yoke/steering wheel that appears, is orientated and operates in a non-tilting steering wheel like manner. Thus, those accustomed to operating a steering wheel in an automobile-like manner will find an easy familiarity with the present invention approach when operating a vehicle configured for flight, or configured to operate in an automobile-like manner (such as a roadable aircraft).

It can also be seen that other disadvantages will unavoidably be encountered with the Ranasey control-stick arrangement, such as a yoke-in-lap outcome (e.g., during full up elevator control input) and knee-knocking yoke and/or mast outcome (e.g., during full left and right roll control inputs), neither of which are control inputs analogous to, or familiar to an operator of, a vehicle configurable to also operate in another vehicle mode, for example, in an automobile-like manner. It should also be noted that Ranasey does not describe a four-bar controller arrangement employable in a vehicle mode other than an aircraft or means for quickly limiting a 3-axis controller to only a steering control input. In contrast, the present invention's four-bar controller arrangement includes quick-locking means for selectively prohibiting pitch and roll control input when it is employed with a vehicle configurable to also operate in an automobile-like manner.

The control yoke mounted on the vertically extended bar member (of the Ranasey four-bar arrangement) presents other shortcomings.

In a first example, the control yoke (20) as configured by Ranasey necessarily moves fore and aft over an arced path defined by the top of the mast pivoting around its lower pivot point, during elevator control inputs. Thus, where the yoke goes, the upper portion of the mast must also go, additionally the yoke and mast movements will define a controller operating-range volume intrusively and unnecessarily operating below, between and immediately above one's upper legs. Moreover, if mast 10 was to receive full elevator up input, for example, at a 45° rearward-directed angle, the plane of rotation of the control yoke (i.e., the yoke's inclination) would also be an awkward or unwieldy 45° located at, or just above, one's lap. When in such a position, it could be very difficult, cumbersome or very non-ergonomic applying full rudder (yoke) control input. It is also noted that such controller adjustments would likely feel very unfamiliar or unnatural to an operator experienced in flying an aircraft, and especially so with a dual-mode vehicle when compared to one's automobile steering experience.

In contrast, the present invention's four-bar arrangement may be equipped to provide a control yoke/steering wheel configuration wherein the latter's plane of rotation, or inclination, does not change, during up to 3 independent axes of full control input, or up to 3 simultaneous axes of full control input.

In a second example of shortcomings pertaining the Ranasey approach, the pulley/cable arrangement illustrated and described for rudder control would at least suggest a strong likelihood that unintended yaw control input would be encountered, and possibly unintended cable binding and/or twisting with elevator control inputs, in which case, either or both would indicate the absence of truly independent 3-axis control input. For example, in reference to Ranasey FIG. 2, it can be seen that as the upper end of mast 10 is moved fully to the left (in the illustration), that it would be necessary to apply an additional or coordinated second axis of control input counter-intuitively opposite, to the right (or clockwise), to compensate for the mast aileron input, otherwise cable or wire 24 will be pulled toward the lower part of the mast around pulley 26, and cable or wire 26 will be extended out from the lower part of the mast, imparting unintended right rudder control input. Conversely, when the upper end of mast 10 is moved fully to the right, with no compensating left or counter-clockwise control yoke rotation, the cables or wires would impart unintended left rudder control input. Accordingly, if one cannot enter either of such aileron control inputs without also having to input compensating control input to another control axis, it would be fair and reasonable to conclude that a true independent 3-axis controller is not being offered, or the 3-axis control approach taken is at least one that is comprised. Similarly, but perhaps to a lesser degree, FIG. 3 of the Ranasey patent suggests that when the upper end of mast 10 is moved fully forward or aft during full elevator control inputs, the rudder cables or wires engaged by the pulleys at the bottom of mast 10 will encounter one or more of the following non-independent control input results: twisting, binding, shortening of one or more rudder cables, or their possible misalignment with one or more pulleys.

Accordingly, it would be advantageous to address the shortcomings of Ranasey, and deficiencies of other prior art approaches, by applying the present invention's improvements and embodiments mentioned above and those described in the sections to follow, thus it is among the objects of the present inventions to provide such improvements and embodiments.

SUMMARY OF THE INVENTION

The present invention pertains to a four-bar vehicle controller providing up to three independent or combined axes of control inputted via a yoke, steering wheel or other hand operated input means attached to an aft end of a control input shaft rotatably mounted to and extending rearwardly from an upper bar member of a four-bar assembly. The four-bar controller arrangement of the present invention, when incorporated into a vehicle in certain configurations, also provides a number of ergonomic improvements to, and/or a simplifying of, the arrangement of controls made available within vehicle operating compartments. For example, the four-bar 3 independent-axis controller aspect of the present invention, with its rearwardly-extending upper bar arrangement also provides the means whereby a pivotally mounted control stick-like member and one or more proximate controller elements thereof, may less intrusively be located further away from an operator, which in turn, facilitates more of an automobile-like ease of entering and exiting the vehicle's operating compartment, and provides for a vehicle control input wherein any positioning of the controller's control input means is maintained within a proximate operating-range volume located comfortably in front of the operator.

Other advantageous aspects attributable to how the four-bar controller apparatus is incorporated into, or configured in certain vehicle operating compartments can provide for an eliminating of redundant controller input means such as rudder pedals, for example, by providing yaw control input via the control yoke/steering wheel rotatably mounted at the aft end of the rearwardly-extending bar (of the four-bar controller apparatus).

The present invention's ergonomic aspects are also configurable to provide one or more of the following features, benefits or outcomes. A vehicle operator selectively choosing among a plurality of adjustable control yoke/steering wheel height settings. An adjusting of a longitudinal position of a control yoke/steering wheel by providing a set of apertures formed in the control yoke hub and along a portion of rearwardly-extending rotational shaft that are sized to receive a set pin or keeper (or other fastening means). An adjusting of a longitudinal position of the control yoke/steering wheel by providing fastening or attaching means configured to secure upwardly extending bar members at an angle e.g., selectable from one or more available pivot angle adjustments. An eliminating of a vertical control stick extending upward between one's legs or thighs. A preventing of an input control means (e.g., a yoke) being moved close to or in an operator's lap when inputting one or more of the following control inputs: full pitch up, full roll, or full yaw. A maintaining of a mounted angle of a rotatable control yoke/steering wheel during control input at least including a full range of pitch control input. A configuring of a four-bar vehicle control such that an aft/'up' pitch input causes a slight raising of the control input means (e.g., upper bar assembly 22, shaft 16 and yoke 12), and a forward/'down' pitch input causes a slight lowering of the control input means, whereby, an operator is provided an added visual cue as to whether an 'up' or 'down' elevator control input is being made. An equipping of yaw control linkage with yaw control input means configured to provide an operator with a familiar steering experience analogous to steering a ground-based vehicle or watercraft while seated in a comfortable driving-like position. A providing of a two-axes locking means made easily accessible to an operator e.g., seated in a vehicle, whereby the operator can selectively insert or remove a locking pin or other fastening means to lock or release (respectively) two axes of control linkage to one another or to the vehicle. An installing of four-bar controller apparatus further forward in a vehicle e.g., proportionate to an increase in the length of the rearwardly-extending upper bar member, to cause an increase in space between an aft vertical bar member (of the four-bar apparatus) and the front of the legs of an operator. A reducing of control input complexity analogous to familiar types of operator control inputs made in the operation of each among a plurality of different vehicle transportation modes. In the latter case for example, an operator in a dual-mode transportation vehicle, such as a roadable aircraft, can in a first transportation mode configured for automobile-like driving, enter and seat himself in an operating compartment of the vehicle, wherein his knees fit comfortably beneath an aft end of a rotatable control yoke/steering wheel, and optionally his feet extend easily forward for engagement with a pedal arrangement arranged in a manner familiar to one having automobile driving experience. Accordingly, an automobile-like arrangement of two or more pedals can be provided, including pedals selectable from the following pedal types: an accelerator pedal, a brake pedal, a clutch pedal (wherein the latter is selected when the vehicle engine is equipped with a manual transmission).

Carrying the analogy further, the operator can easily grasp in one or two hands, a control yoke/steering wheel which provides familiar automobile-like directional control of the vehicle in its ground operational mode (e.g., when the pitch and roll control inputs are also locked by the aforementioned locking or quick-locking means). Alternatively, the four-bar 3-axis controller apparatus, when incorporated in a roadable aircraft, is quickly configurable for a flight mode by releasing elevator and aileron control quick-lock means, to allow movement of the previously locked linkage. In a flight transportation mode the operator easily grasps, in one or two hands, the control yoke/steering wheel to input pitch and roll control, analogous to familiar control stick-like movements (i.e., fore and aft for elevator inputs, and side to side for aileron inputs, or combinations thereof), and alternatively employs the controller's same steering wheel to input a 'steering-like' yaw control in flight. Accordingly, a vehicle configurable as a roadable aircraft incorporating the present invention need only be equipped with those pedals necessary for operating the vehicle in an automobile-like manner (whether incorporating an automatic or manual transmission), without requiring any additional pedal controls, such as rudder pedals, to operate the same roadable aircraft in a flight mode or for taxiing. Thus, the combined number of control inputs for both transportation modes of a roadable aircraft incorporating the present invention are less than the number of control inputs required for the combination of two separate and conventional vehicles (e.g., for a typical aircraft and a transmission equipped automobile). Such aspects are provided to reduce cockpit and control input clutter and confusion, and to increase operating space within a cockpit or control compartment of a vehicle.

It is noted that one or more additional or auxiliary controls or controllers may optionally be incorporated into the present invention's controller apparatus and made operable by one or more digits of an operator's hand. For example, an accelerator control means, engine throttle adjustment means, a light switch, a turn signal, cruise control apparatus, avionics control means or the like could be located (within easy reach of an operator's hand) for example on or near the control yoke/steering wheel or rearward-extending bar, and so forth.

The four-bar, 3-axis controller and vehicle control compartment approach of the present invention, inclusive of the rearwardly-extending (or selectively extendable) portion of the upper bar and the non-tilting control yoke/steering wheel rotatably mounted on its aft end, advantageously employ a parallelogrammatic arrangement in which the four bars are configured to provide a collective pivoting of at least three of the bars in the same plane. It is also noted that certain trapezoidal four-bar variants also based on four pivot points, may optionally or alternatively be advantageously employed, for example wherein a forward vertical member (or bar) is made shorter than and aft vertical member e.g., in order to maintain the height of, or reduce height changes to, a control yoke/steering wheel (during one or more types of 3 axis control inputs). Whether a parallelogrammatic or trapezoidal four-bar arrangement is employed, the present invention provides a four-bar mechanism configurable to ensure that the control yoke/steering wheel rotatably mounted at an aft end of a rearwardly-extending (or selectively extendable) portion of the upper bar has minimal or reduced tilt and/or height changes during one or more control inputs, and is operatively maintained within an ergonomically-enhanced three-dimensional controller volume or space located comfortably in front of an operator and generally above the operator's lap.

The four-bar, 3-axis controller is configured so that clockwise and counter-clockwise rotational inputs made to a control yoke/steering wheel by an operator are imparted to an aft end of a rearwardly-extending (or selectively extendable) shaft which is rotationally mounted (e.g., by one or more bearings) to an upper bar member of the four-bar apparatus. In one of the preferred embodiments a forward end of a first rotational shaft is configured with upper transmission means whereby a rotation imparted to the shaft generally in alignment with a longitudinal axis of the upper bar (or upper bar assembly), is transferred to a pivotally configured upper end of a downwardly-extending second rotational shaft also having a pivotally configured lower end, wherein rotation of the second rotational shaft is imparted to a lower transmission means (e.g., a rack and pinion arrangement) having suitable coupling(s) with, and employable to control, any yaw-controlling apparatus, or steering-controlling apparatus, or both. In one of the embodiments the upper transmission means comprise a matching pair of bevel or miter gears each mounted in a bearing to an upper bar assembly, wherein the forward end of a first rotational shaft is coupled to an aft end of a first bevel gear which is rotatably engaging a second bevel gear having a lower end coupled to an upper end of the second rotational shaft or a universal joint or constant velocity joint thereof. Preferably the second rotational shaft comprises means whereby the shaft is dynamically adjusted in length as needed, for example, in response to elevator control inputs, or combinations of elevator and aileron control inputs, made by an operator. For example, the second rotational shaft may incorporate a ball-spine arrangement; or alternatively incorporate a first shaft member preferably having a polygonal cross-section (defining an inner diameter or I. D.), and a second shaft member preferably having a similar polygonal cross-section (defining an outer diameter/O.D.) wherein the second shaft member is slidably operable within the first shaft member, and the two shaft members collectively transfer rotational inputs, such as yaw and/or steering control inputs to lower transmission means coupled with yaw and/or steering control components. Depending on the type of upper transmission means being employed (for example comprising a pair of fixed gears, or a flexible coupling) it may be necessary or advantageous to employ a universal or constant velocity joint attached with a upper end of the second rotational shaft, or lower end of the second shaft, or both, and it is noted that the present invention is configurable to so accommodate such one or more joints. It is also noted that any among a variety of friction-reducing means may be incorporated between one or more O.D. portions of a second shaft member and one or more I.D. portions of a first shaft member (when advantageous to do so). Alternatively, rotational control input transferable to a downwardly-extending rotational shaft can be accomplished by eliminating the previously described bevel (or miter) gears and coupling each of the upper and lower ends of the downwardly-extending rotational shaft directly to a flexible joint such as a universal joint or constant velocity joint, wherein the shaft is configured to incorporate any one or more of the previously described shaft components, and the lower end of the shaft/joint is pivotally mounted to the vehicle at a distance far enough forward of the four-bar apparatus to allow the shaft to freely rotate within the flexible joint's angular tolerance range.

In another preferred embodiment it is noted that any one or more of the previously described transmission means, bevel or miter gears, and/or universal joints or constant velocity joints may be replaced with a flexible shaft coupler, or an elongated flexible shaft. For example, a forward end of a first rotational shaft (e.g., mounted in one or more bearings to an upper bar assembly) may instead be configured with a flexible shaft, or a flexible shaft coupler. In the latter case, a rotation imparted to the first rotational shaft, generally in alignment with a longitudinal axis of the upper bar (of the four-bar apparatus) is transferred to an aft end of the flexible shaft coupler which in turn transfers the rotation in a downwardly-extending manner to a lower end of the coupler which in turn is coupled with an upper end of a downwardly-extending rotational shaft (the shaft in turn being configurable in accordance with any of the rotational shaft arrangements previously or subsequently described herein). Alternatively, a flexible shaft embodiment can be configured to incorporate a single elongated flexible shaft. For example, wherein a rotation imparted to the first rearwardly-extending rotational shaft (e.g., mounted as previously described to an upper bar or upper bar assembly) is transferred to an aft end of the elongated flexible shaft which in turn transfers the rotation in a downwardly-extending manner to an upper end of a coupling made with a lower transmission means (e.g., a rack and pinion arrangement) having suitable coupling(s) with, and employable to control, any yaw-controlling apparatus, or steering-controlling apparatus, or both.

While the above approaches, configurations, arrangements and embodiments of the present invention incorporating a four-bar 3-axis controller have been described in the context of the 3-axis control being employable with a vehicle configured to operate as an aircraft, its noted that the same controller approach may instead be applied to other vehicle types typically employing 3-axes of control, for example a vehicle equipped to operate in one or more transportation modes, a helicopter, a gyrocopter, a submarine or other underwater craft, a blimp, dirigible or other type of airship, a glider or sailplane, a seaplane, a heavier-than-air aircraft equipped with one or more floats, and so on. Alternatively or additionally, the four-bar control can be adapted to interface with a computer or handheld device input port to provide a game or simulator controller.

The foregoing has outlined rather broadly features and advantages of the present invention so that those skilled in the art may better understand the detailed description of the invention that follows. Further advantages of the invention will be set forth, in part, in the description below, and in part will be apparent from the description, or may be learned by practice of the invention. The advantages of the invention may be realized and obtained by any combinations set forth in attached claims.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 5 illustrates an option to include a two-axes locking mechanism whereby an operator can selectively lock roll and pitch input and output. FIGS. 5 and 6 further depict an option to form or adjust an angle between a lower portion and a upper portion of an upward-extending rear bar member.

DETAILED DESCRIPTION OF THE PREFERRED EMBODIMENTS

Figure 1:
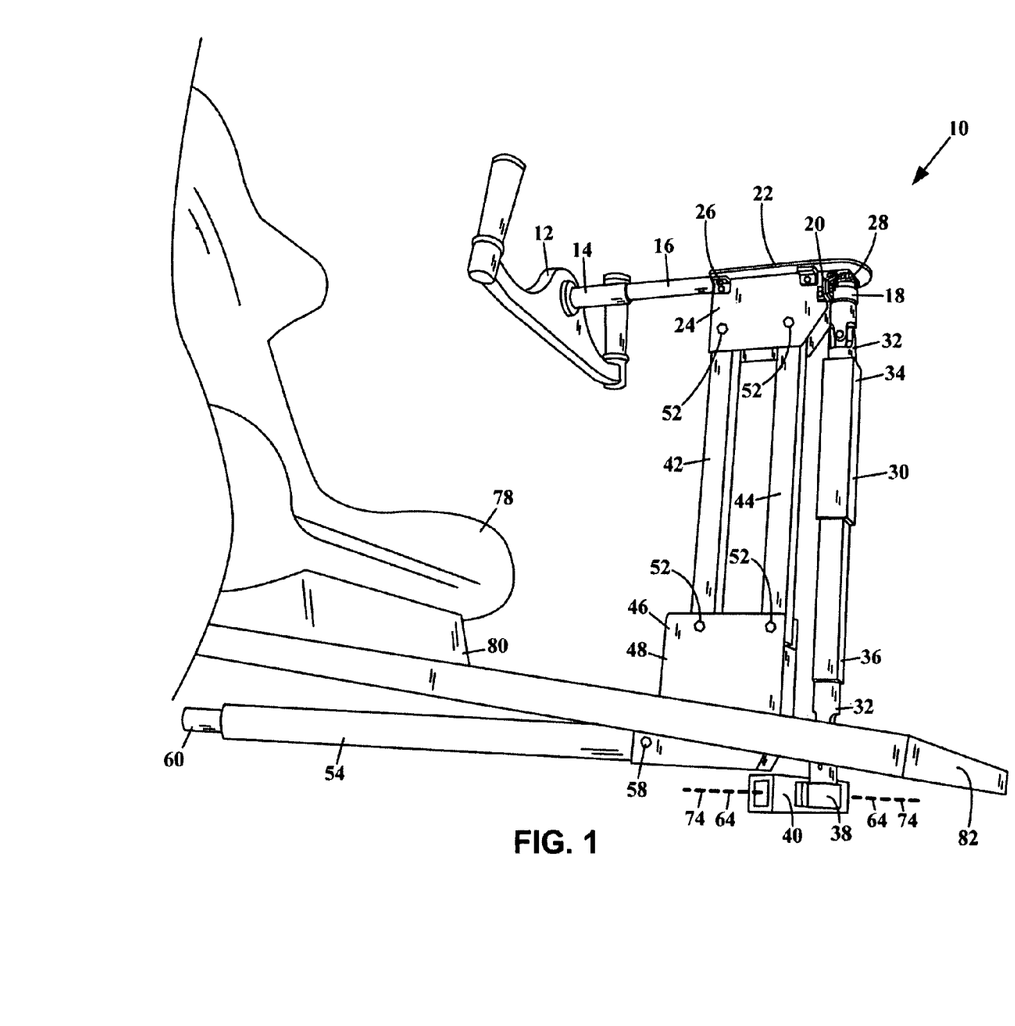
FIGS. 1 and 2 are three-dimensional side view depictions of a three-axis controller, equipped to provide up to three independent or combined axes of control, employable in a vehicle configured for operating in a single mode of transportation, or configurable for operating in each of a plurality transportation modes.
Figure 2:
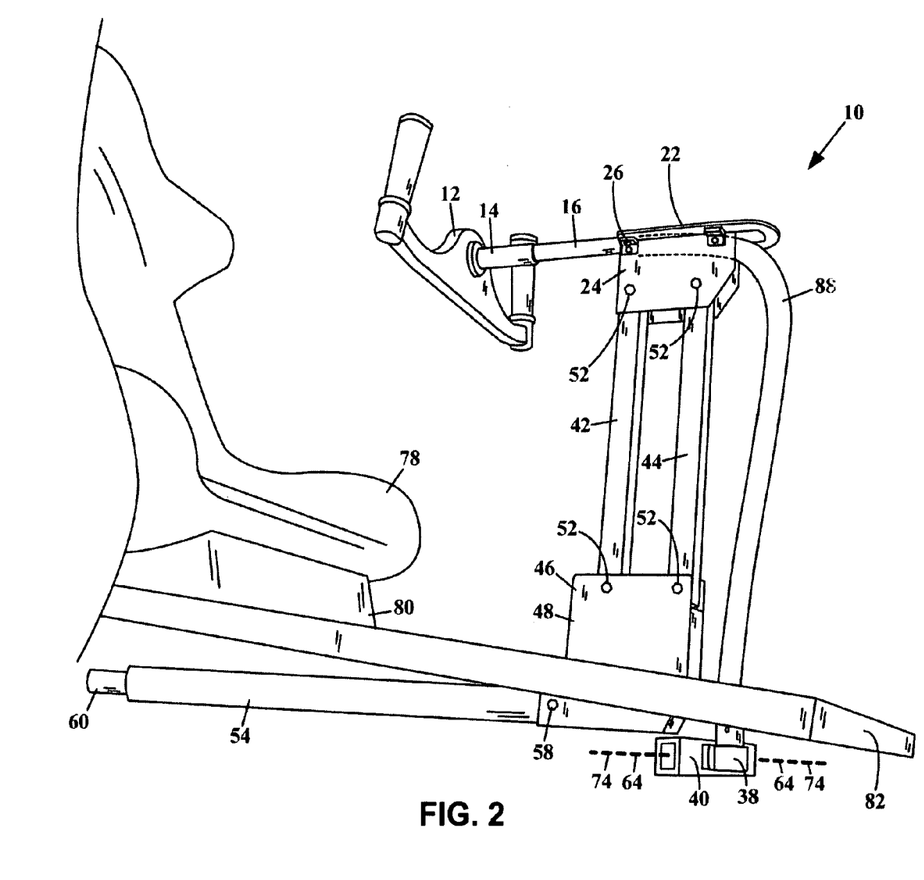

In reference to FIGS. 1 and 2, a side view of a four-bar 3-axis controller 10 equipped to provide up to three independent or combined axes of control is shown being incorporated into a vehicle control compartment inclusive of a compartment floorboard 82, and is depicted forward of an operator seat 78 (shown mounted on seat mount 80) such that a pilot or operator when seated may comfortably make control inputs with a control yoke/steering wheel 12 to operate a vehicle requiring 3 axes of control, for example an aircraft, or a roadable aircraft during flight operations or ground-based travel. Control yoke/steering wheel 12 is shown attached to an aft end of an elongated rotational control input shaft 16 which is rotatably mounted to an upper bar member 22 of a four-bar assembly to extend rearwardly from the assembly, and is depicted having mounted on an aft end, a mounting hub 14 for mounting a yoke/steering wheel 12 (or other control input controllable by operator inputs made from a single hand or made from two hands). The single rotational control input shaft 16 of the present invention is equipped to receive up to three independent, or combined axes of control inputs made by an operator, and to output each control input to a respective vehicle control linkage associated with the control input(s). The orientation of the control input shaft on the upper bar member 22 provides means for reducing or eliminating certain undesirable control yoke positionings. For example, an adjustable length or angle of one or more bar members of the four-bar assembly (depicted in other drawing figures) can be configured such that the vertical height of the yoke may be maintained during full up elevator input (or at a near constant height), or at a slightly increasing height as more up elevator is inputted e.g., providing a visual cue that an 'up' control is being applied. Accordingly, such configurations eliminate a less comfortable, and/or less ergonomic, 'yoke-in-lap' occurrence that can happen with yokes, or other hand control(s), mounted on top of a single upwardly extending input control shaft or stick.

While mounting hub 14 is shown extending forward to partially encompass an aft end of control input shaft 16 it is noted that the hub length may be made shorter or longer than shown. When configured longer, a length of the hub may be equipped with yoke longitudinal-position locking means, such as, a plurality of aligned apertures formed in the shaft allowing an alignable aperture formed in the hub to be pinned, screwed or bolted (or otherwise locked) to one of the shaft apertures to determine a longitudinal positioning of the control yoke/steering wheel best suited for a given operator and for a given vehicle transportation mode. For example, it may be preferable or optimal to have a yoke longitudinal positioning selectable for ground-based vehicle steering at one longitudinal position, and a different longitudinal positioning selectable for flight operation. Preferably the rearwardly-extending (or selectively extendable) input control shaft 16 is rotatably mounted in an axis generally aligned with an upper bar or upper bar assembly 22 (of the four-bar apparatus) e.g., within or supported by one or more bearings. For example, input control shaft 16 may be rotatably mounted to an upper 'bar' member 22 or assembly, supported on either side by an upper bar side plate 24 wherein the side plates and member 22 are attached together by suitable fastening means such as one or more upper bar mounting brackets 26. The '4-bar' control apparatus further comprises an aft upwardly extending bar 42, a front upwardly extending bar 44 and a generally horizontal, lower bar member 46 (or assembly), wherein each upper end of the two vertical bar members is pivotally mounted to the upper bar member 22 (or assembly) and each lower end of the two vertical bar members is pivotally mounted to the lower bar member 46 (or assembly) e.g., wherein each of the upper and lower ends of the vertical bar members are mounted at a pivot point 52 by a suitable pivot fastener or fastening means. It is noted that aft upwardly extending bar 42, front upwardly extending bar 44 (and downwardly-extending rotational shaft 30 in FIG. 1) are pivotally mounted to upper and lower bar members (or assemblies) having sufficient space between them to accommodate optimal and full elevator control inputs from control yoke/steering wheel 12.

To impart independent pitch control with the four-bar assembly, an operator positions the yoke/steering wheel 12 (or other hand operated control input) in a typical forward or aft manner causing the upper bar member 22 (rotatably supporting shaft 16) to correspondingly move forward or aft. A pivot coupling made at a lower portion of the aft upwardly extending bar 42 at pivot point 52 (a rearward pivot point on lower bar member 46) causes a lowest end of bar 42, pivotally coupled to a forward portion of elevator linkage (e.g. an elevator tube 60) to move in an opposite direction than the input made to the upper end of bar 42. Accordingly, up elevator or rearward pitch control input to the yoke, positions tube 60 forward, and down elevator or forward pitch control input to the yoke, positions tube 60 rearward.

To impart independent roll control with the four-bar assembly, an operator positions the yoke/steering wheel 12 (or other hand operated control input attached to an aft end of shaft 16) in a typical side-to-side manner causing the upper bar member 22 (rotatably supporting shaft 16) to correspondingly move side-to-side. Preferably the lower bar member 46 (or assembly) is attached to a rotatably mounted tube, such as an aileron control input tube 54, whereby a lateral roll control input made to yoke 12 and input control shaft 16 is imparted to the aileron tube 54 (to correspondingly rotate the tube along its longitudinal axis) and transmit the rotation via an aileron coupling, such as an arm or horn, coupled to aileron control linkage (not depicted in FIG. 1).

To impart independent yaw (or steering) control with the four-bar assembly, an operator positions the yoke/steering wheel 12 (or other hand operated control input attached to an aft end of shaft 16) in a clockwise or counter clockwise manner causing the rotatable input control shaft 16 (mounted on upper bar member 22) to correspondingly rotate clockwise or counter clockwise. In one of the embodiments of the present invention, depicted in FIG. 1, a bearing mount 20 is shown supporting bearing 18 which is rotatably supporting a lower end of upper rotation transmission means comprising an upwardly pointing bevel gear 28 connected to an upper end of a universal joint 32 and a forward end of input control shaft 16 equipped with a forward-pointing bevel gear (not shown if FIG. 1) disposed to engage and interact with gear 18. In operation, a rotation imparted to input control shaft 16, by an operator, is transmitted to downward extending drive shaft 30 (via the upper rotation transmission means). An upper portion of drive shaft 30 is configured as an upper universal joint support 34 (and mount). A lower universal joint support 36 is configured slidably positionable in alignment with the longitudinal axis of drive shaft 30, and is configured at a lower end to mount and retain a lower universal joint 32, which in turn is coupled to an upper end of a pinion gear shaft. Accordingly, a yaw or steering control rotational input imparted to bevel gear 28, by an operator rotating yoke 12 and input control shaft 16 clockwise or counter clockwise, is transferred via downward extending drive shaft 30 and lower universal joint support 36 as rotation imparted to suitable lower rotation transmission means, such as the combination of a pinion gear 38 and rack 40, wherein opposite ends of the rack are suitably coupled to yaw and/or steering linkage, comprising cables 64, or push-pull rods or shafts 74.

It is noted that the embodiment depicted in FIG. 1 provides a length self-adjusting forward rotatable member (comprising the aforementioned 30, 32, 34 and 36 elements) whereby control input made for one or more axes of control other than yaw and/or steering control, are accommodated by any self-adjusting of the forward rotatable member length that is required.

It is further noted that a combination of any two axes of control input (or any ratio thereof) can selectively be input by an operator independent of a third axis of control, and any combination (or degree) of the three axes of control inputs can also be selectively input by an operator via the yoke 12 attached to single input control shaft 16.

In FIG. 2 an embodiment of the four-bar apparatus of the present invention is depicted wherein all components pertaining to the downwardly-extending rotational shaft 30 (of FIG. 1) and forward of front vertical bar 44 are removed, and replaced with rotation transmission means comprising a single elongated flexible shaft 88 attached at an upper aft end (depicted in dashed lines) to a forward end of rotatable control input shaft 16. As seen in FIG. 2, the flexible shaft first extends forwardly and then downwardly, wherein a lower end of the flexible shaft is coupled to suitable yaw-control means, or steering control means, or both (depending on the type of vehicle and vehicle operational mode). For example, the lower end of the elongated flexible shaft 88 may be rotationally coupled with the shaft end of a pinion gear 38 (e.g., a gear protected within a gear housing) and the pinion gear operatively associated with a gear rack 40 (such a rack gear protected within a housing) wherein opposite ends of the rack gear are suitably coupled or attached with an end of a cable 64 (or wire) or rod 74 which in turn is suitably coupled to provide vehicle yaw control, or steering control, or both as needed.

Accordingly, a four-bar vehicle control assembly of the present invention is configurable with one or more rotation transmission means (e.g., a rack and pinion arrangement) interposed between a forward portion of rotational shaft 16 and yaw control linkage, or steering control linkage, or both.

In both FIGS. 1 and 2 a parallelogrammatic arrangement is provided wherein opposite ends of each 'bar' of the four-bar apparatus are attached to two pivot points 52, wherein the four pivot points 52 define a rectangular shape. However it is noted that alternatively, opposite bar members, such as aft upwardly extending member 42 and front upwardly extending member 44, can be made at, or made adjustable to, different lengths, and/or a first pair of the pivot points spaced differently than a second pair of the pivot points, and in each case, a trapezoidal four-bar arrangement is then provided (e.g., wherein at least two opposite bars are not parallel to one another) to provide one or more of the trapezoidal arrangement advantages described herein.

In operation, pertaining to elevator and aileron control input, the control yoke/steering wheel 12 and rotatably connected control input shaft 16 depicted in FIG. 2 are operated in accordance with the aforementioned methods described in reference to FIG. 1.

In one of the preferred embodiments, a lower bar member 46, or lower bar assembly comprising two side plates 48, lower bar mounting brackets 50, and suitable fasteners, extends downwardly to a lower portion of the four-bar apparatus (e.g., ending at a point below compartment floorboard 82) where the lower bar member, or lower bar assembly is configured to positively engage the aileron tube 54 for example with one or more suitable fastening means (e.g., a transverse fastener 58) such that any roll control input applied to the upper portion of the four-bar apparatus is transferred into a corresponding rotation of the aileron tube 54, or shaft, rod, or the like (depicted in FIGS. 1 and 2 as a tube coaxially mounted around most of the length of elevator tube 60). It is noted that the elevator and aileron tubes depicted in FIGS. 1 and 2 would be supported by one or more suitable bushings or bearings or the like.

Accordingly, it can be seen from the side view depiction of FIGS. 1 and 2 that the four-bar 3-axis controller 10 of the present invention provides up to 3 independent axes of full control input, or up to 3 simultaneous axes of full control input. It can also be seen in FIGS. 1 and 2 that one or more of the previously described ergonomic advantages of the four-bar apparatus inclusive of the rearwardly-extending rotational shaft mounted in general alignment with the axis of an upper bar member, or upper bar assembly, are employable. For example, any of the means previously described for extending control yoke/steering wheel 12 further rearward also provides the option to locate the four-bar apparatus further forward, thereby increasing the space and/or volume between the legs of the operator and for example the aft vertical member 42.

Figure 3:
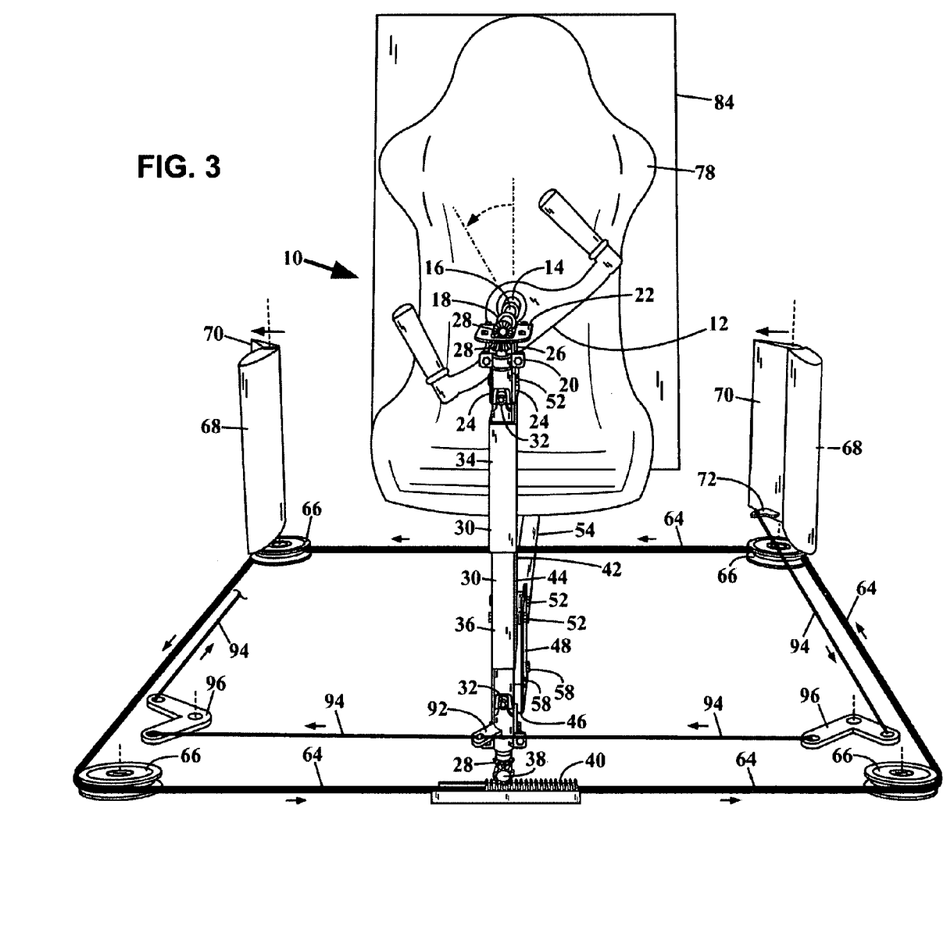
FIGS. 3 and 4 are simplified three-dimensional front view depictions of a three-axis controller equipped to provide up to three independent or combined axes of control, wherein FIGS. 3 and 4 provide a diagrammatical representation of input made from a control yoke/steering wheel imparted to control components configurable to provide at least rudder control, and optionally or additionally employable in the control of steering-related components. The yoke/wheel is positioned clockwise in FIG. 3 and counter clockwise in FIG. 4 from an operator's perspective.
Figure 4:
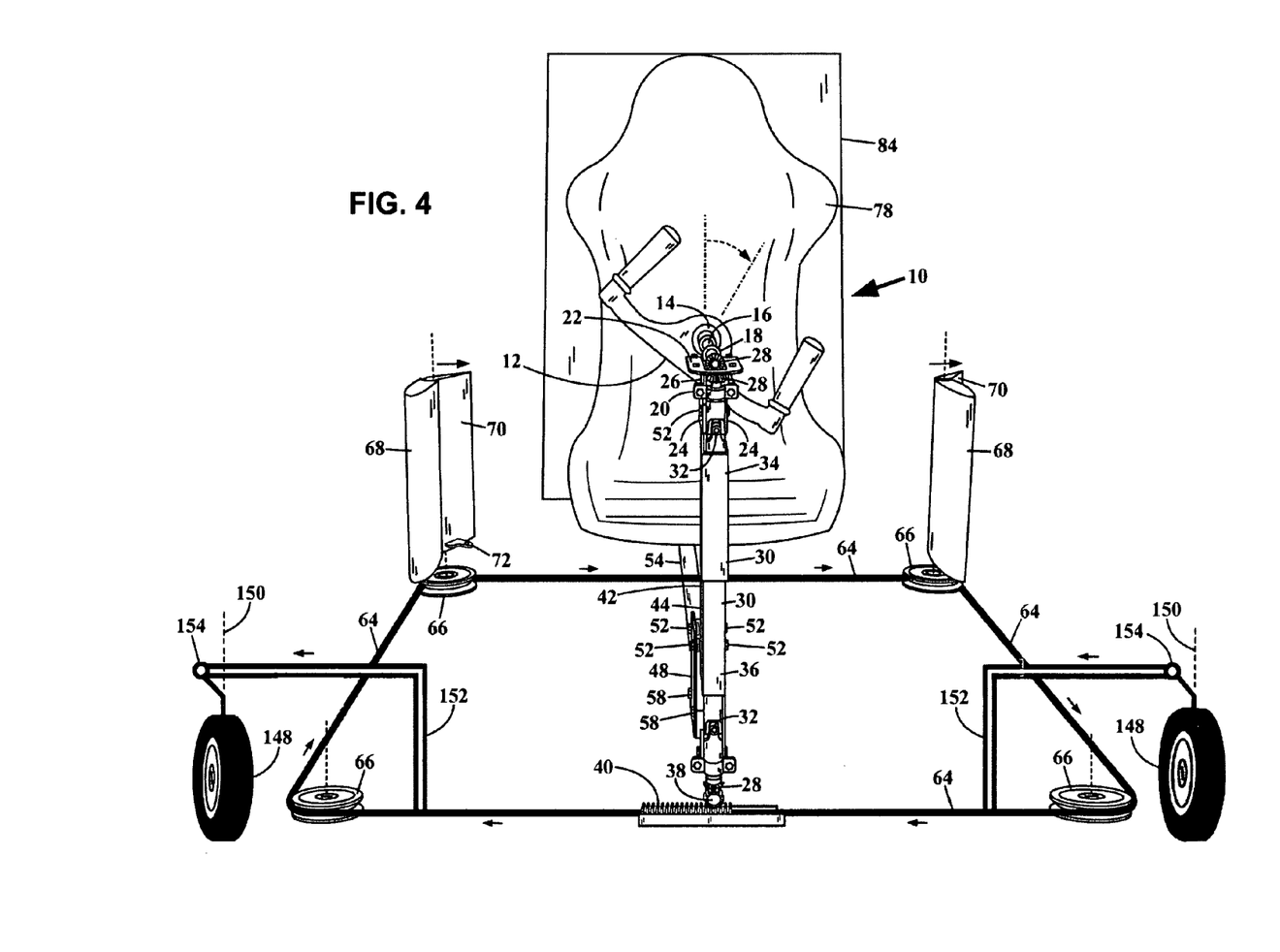

In reference to FIGS. 3 and 4, a front view of a four-bar 3-axis controller 10 equipped to provide up to three independent or combined axes of control is depicted in front of a seat 78 such that a pilot or operator when seated may comfortably make control inputs with a control yoke/steering wheel 12 to operate a vehicle requiring 3 axes of control, such as an aircraft, or a roadable aircraft during flight operations or ground-based travel. For example, cockpit ergonomics can be improved by eliminating a conventional vertical control stick Control yoke/steering wheel 12 is shown attached to an aft end of a rearwardly-extending rotatable control input shaft 16 e.g., by a yoke/steering wheel mounting hub 14 or other common yoke mounting means. Preferably rotational shaft 16 is rotatably mounted in an axis generally aligned with an upper bar or upper bar assembly (of the four-bar apparatus) within one or more bearings 18. For example, rotational shaft 16 may be rotatably mounted to an upper 'bar' horizontal member 22 or assembly of a '4-bar' control apparatus, the latter further comprising an aft vertical bar 42, a front vertical bar 44 and a lower bar horizontal member 46 (see also side view drawing figures of controller 10), wherein each upper end of the two vertical bar members is pivotally mounted to an upper bar horizontal member 22 or assembly and each lower end of the two vertical bar members is pivotally mounted to a lower bar horizontal member 46 (or assembly) e.g., wherein each of the upper and lower ends of the vertical bar members are mounted at a pivot point 52 by a suitable transverse pivot fastener. It is noted that aft vertical bar 42 and front vertical bar 44 are pivotally mounted to upper and lower bar horizontal members (or assemblies) having sufficient space between them to accommodate optimal elevator control inputs from control yoke/steering wheel 12.

It is noted that any of the 3-axis control input means described herein may be configured to impart control inputs to any one or more among a variety of commercially available control-input related parts or components, for example, including, but not limited to, one or more of the following: couplings, horns, bell cranks, connectors, fasteners, cables, wires, rods, push-rods, linkages, universal or constant velocity joints, bearings, flexible couplers, flexible shafts, hydraulic components, ball-splines, electro-mechanical components, actuators, linear actuators, transducers, electro-servo components, fly-by-wire components, computer controllable actuators, servos, stepper motors, motors, and the like.

As described in reference to other drawing figures provided herein, a lower bar horizontal member 46 or assembly is preferably mounted to or integrally formed with a forward portion of a tube or a shaft, such as an aileron control tube 54. In FIGS. 3 and 4 a lower bar horizontal member 46 or assembly is optionally equipped with a sleeve or tube aligned in the longitudinal axis having an inner diameter which the aileron tube coaxially fits within and is securely retained by one or more aileron tube fasteners 58 (or configured with other aileron tube fastening means). In each case, a familiar control stick or joystick-like control input can be made via control yoke/steering wheel 12, wherein independent forward and aft control input and independent side to side control input, or combinations of both, are accommodated, providing a form of elevator and aileron control input that will be quite familiar to those having control stick or joystick flying experience.

Another advantageous aspect of the present invention is provided by employing another familiar form of control input, which provides a sense of 'steering' the vehicle in air and on the ground with the control yoke/steering wheel 12. This second familiar means of control also helps to overcome the problem of cockpit clutter and a possibility that too many controls in the cockpit may cause confusion or the making of hazardous mistakes during either of the transportation modes of a dual-use vehicle equipped for both air and ground operations. For example, a dual-mode air and ground use vehicle could employ four to five foot operated pedals in a cockpit, wherein two pedals are employed in a conventional rudder control manner, and two to three other pedals used for ground based vehicle operations, such a gas pedal, brake pedal and optionally a clutch pedal. While it is possible to additionally include cockpit-located rudder pedals in combination with one or more of the rudder control approaches described herein, preferred embodiments of the present invention eliminate this need (and unnecessary cockpit clutter) by incorporating a control yoke/steering wheel 12 which provides a familiar steering of the dual-mode vehicle in ground-based operations, and in effect a sense of 'steering' the vehicle when in flight (or when taxiing). For example, in flight, when the operator of the dual-mode vehicle turns the control yoke/ steering wheel 12 clock-wise, one or more rudders 70 (or pivotable vertical stabilizers) of the vehicle, connected or coupled with control linkage or components responsive to yoke/wheel input, are moved to provide a yaw or 'turning' of the vehicle to the right, as can be seen in FIG. 3. Conversely, when control yoke/steering wheel 12 is turned counter clockwise, one or more rudders 70 of the vehicle are moved to provide a yaw or 'turning' to the left, as can be seen in FIG. 4. Thus, a dual-mode vehicle controller 10 accommodating up to three independent axes of control is provided, wherein all necessary directional control of the vehicle, whether independently or collectively inputted during flight, singularly inputted during ground operations, may be achieved in a familiar manner, and by input from one or both hands of the vehicle's operator.

To illustrate an example of the above-mentioned in-flight 'steering effect' a simplified lower portion of FIGS. 3 and 4 diagrammatically depicts a yaw-control approach which is accomplished without (or by eliminating the clutter of) cockpit-located rudder pedals. To further simplify the depiction, steering linkage or components employable in ground-based control of the dual-mode vehicle and responsive to input from yoke/steering wheel 12 are not shown in FIG. 3. It is also noted that while FIGS. 3 and 4 depict the use of cabling and pulleys, for example in a closed-loop cable system, that any one or more among a variety of other rudder control components and/or linkage responsive to control yoke/steering wheel input, may alternatively be employed for rudder control, including, but limited to, one or more among the following: hydraulic components; electro-mechanical components, motors, servos or actuators; cabling; bell cranks; control horns or arms; push rods; push-pull rods; connecting rods; torque or torsion tubes or rods; tensioners; pulleys; idlers; clevises; fasteners; and the like.

Referring now to FIG. 3, a rack and pinion gear arrangement is depicted comprising a pinion gear 38 and gear rack 40 wherein a cabling arrangement comprising cable 64 is shown attached to opposite ends of rack 40 and operatively encompassing a plurality of pulleys 66, each of the latter depicted having a vertical dashed line extending upward from its rotational axis. The two pulleys depicted beneath vertical stabilizers 68 show vertical dashed lines extending upward through a rotational axis of rudders 70. In operation, a clockwise input from yoke/steering wheel 12 (as seen from a seated operator's point of view) is depicted wherein the yoke/wheel when level has vertical axis represented by the vertical dashed line seen above yoke/steering wheel mounting hub 14. In the rotated position shown, that vertical axis is represented by the angled dashed line at approximately an eleven o'clock position (pointed to by the arrowhead at the end of the dashed-line arc). A rotating of control yoke/steering wheel 12 rotates bevel gear 28 which is attached to a front end of longitudinal-axis rotational shaft 16, which in turn rotates a corresponding bevel gear 28 which is attached to an upper end of, and thereby rotates vertical drive shaft 30 the latter comprising upper universal joint support 34 and lower universal joint support 36 each having, a mating polygonal or splined cross-section. In one of the preferred embodiments of the present invention vertical drive shaft 30 preferably comprises a lower universal joint support 36 wherein the support is configured to be slidably operable within an upper universal joint support 34 (preferably including a friction-reducing material or ball spline mechanism located between the outside of lower joint support 36 and inside of upper joint support 34), wherein a first universal joint 32 is mounted within an upper end of the upper universal joint support 34 and a second universal joint 32 is mounted within a lower end of the lower universal joint support 36. Accordingly, the slidably-adjustable vertical drive shaft 30 accommodates the previously described elevator fore and aft control input, and aileron side to side control inputs made to yoke/wheel 12, while separately providing a third axis of control to one or more rudders in flight (and steering for directional guidance when the vehicle is on the ground). It is noted that while rotational input of the yoke/ wheel has been described as being transferable via rotatably mounted shafts, that other approaches may be incorporated without departing from the scope and spirit of the present invention. For example, a flexible driveshaft may be attached at one end to control yoke/steering wheel 12 (or hub thereof) and supported in a first longitudinal axis (e.g., by one or more bearings), and then directed in a downward direction or axis (which optionally may be supported by one or more bearings), equipped at an opposite end of the flexible shaft with suitable mechanical transmission means for imparting rotational yoke/wheel input to one or more rudders (or one or more pivotable vertical stabilizers) during aircraft-related operations, and to one or more wheels of the vehicle during ground-based operations. Alternatively, one or more pair of corresponding bevel gears 28 may be replaced and an adjacent universal joint eliminated by employing a shorter flexible drive shaft or coupling having a length suitable for accommodating the angles between a longitudinal and downward directed (or generally vertical) axes. For example, a first end of a flexible driveshaft coupling may be attached at a forward end of a longitudinal-axis rotational shaft 16 and a second end of the flexible shaft coupling directed downward and attached with an upper end of a vertical drive shaft 30 (or other drive shaft assembly). In another approach, a flexible driveshaft may be attached at a forward end of a longitudinal-axis rotational shaft 16 (or shorter shaft) and a second end of the flexible shaft coupling directed downward and attached directly to a rack and pinion, or to a rotational element of other suitable transmission means configured to control one or more rudders, vertical stabilizers, and/or wheels in response to control yoke/steering wheel 12 input.

For the purposes of illustrating an example, a rotation of a vertical drive shaft 30 (or other drive shaft assembly) is transmitted in FIG. 3 via a bevel gear 28 mounted at a lower end of shaft 30 and transmitted to a corresponding bevel gear (not shown) attached to an aft end of pinion gear 38. It is noted however that the lower bevel gear may be eliminated and the lower end of the rotational shaft can be coupled with other transmission means. For example the shaft can be coupled with a pinion gear of a rack and pinion arrangement as previously described in reference to FIGS. 1 and 2. Thus, an operator making a clockwise control input to control yoke/ steering wheel 12 causes rack 40 to move to the right, which in turn causes cable 64 to move in the direction of the arrows (shown adjacent to the cable).

In FIG. 4 an operator making a counter clockwise control input to control yoke/steering wheel 12 causes rack 40 to move to the left, which in turn causes cable 64 to move in the direction of the arrows (shown adjacent to the cable). Thus an axle extending upward from a pulley and attached in alignment with the rotational axis of a rudder (such as a pulley 66 nearest to a rudder 70) provides rudder control. In ground-based operations lateral control input made to cable 64 can additionally be coupled to wheel steering linkage 152 to impart steering control input via a coupling e.g. pivot coupling 154 made with a steering arm extending outward from a rotatable wheel steering member aligned with a wheel pivot axis 150 of wheel assembly 148. Or, as depicted in FIG. 4, a similar approach can be applied to a second steerable wheel located near the front of a vehicle to provide control of two wheels at a time. Alternatively, ground-based steering of a vehicle can be provided by a coupling of wheel steering linkage to a control arm or horn configured similar to the aforementioned adjustable rudder control arm 92 depicted in FIG. 3, or via a coupling made with rack 40 of FIG. 3, or made with one or more other rotation transmission means described herein (e.g., FIGS. 5-8, 11-12).

It is noted that one or more wheels and respective wheel assemblies of a vehicle, configured to bear the loads of repeated aircraft landings, may be selectively fitted with a releasably attachable float or ski, or a releasably attachable float or ski assembly whereby, in either configuration, the vehicle can optionally provide use as a seaplane equipped to taxi, takeoff, and land on the floats, or land, takeoff and taxi or snow or ice. Alternatively or additionally, float or ski attachment points can be provided on a vehicle whereby one or more of either can be attached, for example, on the vehicle, of vehicle frame, e.g., proximate to the mounting points of one or more wheels.

While a single cable is shown operably encompassing a plurality of pulleys in FIGS. 3 and 4, as a means of providing rudder control, it is noted that a number of ways of translating clockwise and counter clockwise inputs made with control yoke/steering wheel 12 into rudder control input have also been described and may alternatively be employed. For example, in FIG. 3, the option of employing two bell cranks 96 is also diagrammatically depicted, each having been rotatably positioned by suitable linkage 94, or other commercially available coupling made between an aperture near the end of rotatably adjustable rudder control arm 92 and an aperture at an end of an arm of each bell crank 96. The bell crank on the right side of the drawing illustrates a connection made with a linkage 94 made between an aperture at an end of second arm of the bell crank and an aperture located at an end of a rudder control horn 72 operably mounted on the lower side of a rudder 70. It is noted that the present invention can alternatively be configured with other bell crank arrangements employable in any of the dual-mode vehicle's three axes of control. For example, a 3-armed bell crank may be employed, wherein a first bell crank arm is made positionable by suitable linkage or coupling made with a positionable control input component of the vehicle, such as a rotatably adjustable rudder control arm 92, or with a rack 40, a second bell crank arm shares a coupling with a control horn operably mounted on a first side of a rudder 70 (or other positionable aerodynamic surface), and a third bell crank arm shares a coupling with a control horn operably mounted on a second side of the rudder (or other positionable aerodynamic surface). A 3-armed bell crank can alternatively be made responsive to steering wheel inputs made by an operator for example, wherein one of the arms is operatively coupled with wheel steering linkage to control steering input made to one or more wheels, and another arm coupled in a manner previously described pertaining to the control of one or more rudders, including the option to configured the arms, relative to the bell crank pivot axis, at different lengths to impart different ratios of control (e.g., wherein a greater ratio/range of steering control is provided than the ratio/range of control provided for yaw control). Alternatively, a two-armed bell crank having an axis of rotation located between the ends of the two bell crank arms, can be attached with, adjoined to, or integrally formed with an end of, or along the length of, a rotatably adjustable control rod, tube or shaft, wherein the adjoining first bell crank arm shares a coupling made with a first control horn operably mounted on one side of a positionable aerodynamic surface, and a second bell crank arm shares a coupling made with a second control horn operably mounted on an opposite side of the positionable aerodynamic surface, and so forth.

In an illustration of an optional bell crank arrangement diagrammatically depicted in the lower portion of FIG. 3, it can be seen that a rotating of the control yoke/steering wheel 12 to the position shown causes a corresponding rotation of a vertical drive shaft 30 to occur. In turn, a rotatably adjustable rudder control arm 92 mounted to a side of vertical drive shaft 30 rotates from a forward-most centered position to the position shown, and each cable or other suitable coupling or linkage fastened at an end of rotatably adjustable rudder control arm 92 and fastened to each incorporated bell crank is rotated clockwise. Thus, the bell cranks 96 diagrammatically depicted on the left and right sides of FIG. 3 will also rotate in a clockwise manner, imparting a pulling motion on rudder control horn 72 (shown coupled to the right bell crank 96), thereby providing right yaw control to the rudder.

Figure 5:
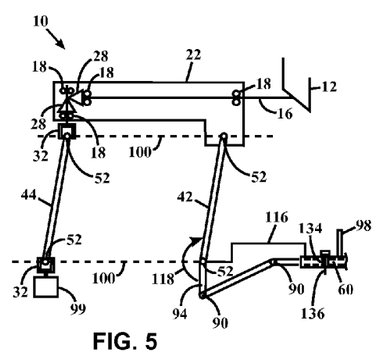
FIGS. 5 and 6 are graphical side-view depictions of a forward portion of a four-bar vehicle control assembly incorporating a rotatable an upward-extending front bar member as one of the four bars.

In reference to FIG. 5, a forward portion of a four-bar vehicle control assembly is shown incorporating a rotatable upwardly extending front bar member 44 (having an upper and lower universal joint 32) as one of the four bars of the four-bar assembly. Two upper pivot points 52 are located in an upper shared axis 100 and two lower pivot points 52 are located in an lower shared axis 100. The alignment of the lower axis 100 (shared with the lower pair of pivot points 52) with the axis of roll tube 54 accommodates a full range of pitch and/or roll control inputs without the need of an adjustable length forward bar member (as depicted in FIG. 1). Preferably the upper and lower axis 100 are configured parallel to one another so that no sinusoidal variation is imparted by the universal joints 32.

Figure 6:
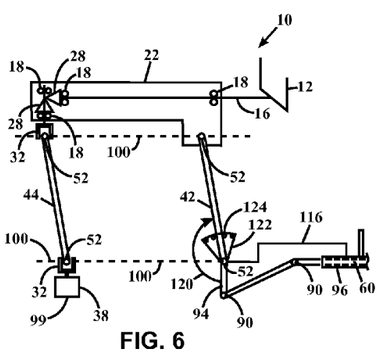

In FIG. 5, the rotatable front bar member 44 is shown having an upper end mounted to a universal joint 32 which in turn is attached to the lower end of a shaft having an upward pointing bevel gear 28 configured to rotatably engage and interact with the forward-facing bevel gear 28 attached to the forward end of control input shaft 16 (as in FIG. 1). Preferably bearings 18 are employed to rotatably support each of the shafts and to provide friction reducing means. In operation, a rotating of yoke 12 inputted by an operator causes a corresponding rotating of attached control input shaft 16, such that an upper rotation transmission means e.g., comprising a pair of bevel gears, transmits the rotation of shaft 16 to forward rotatable bar member 44, which in turn rotates a lower universal joint 32 attached to an upper end of rotation transmission means 99 e.g., a pinion gear of a rack and pinion assembly. An aft upwardly extending bar member 42 is depicted having a >180 degree angle 118 formed into a lower portion (which, as depicted in FIG. 6 may alternatively be made adjustable in ranges +/−180 degrees), whereby lower portions of the four-bar assembly can be located, e.g., in a vehicle cockpit or cabin, further from an operator's legs and/or feet. It is noted that, aft upwardly extending bar member 42 can optionally be formed with a <180 degree angle.

Figures 7, 8:
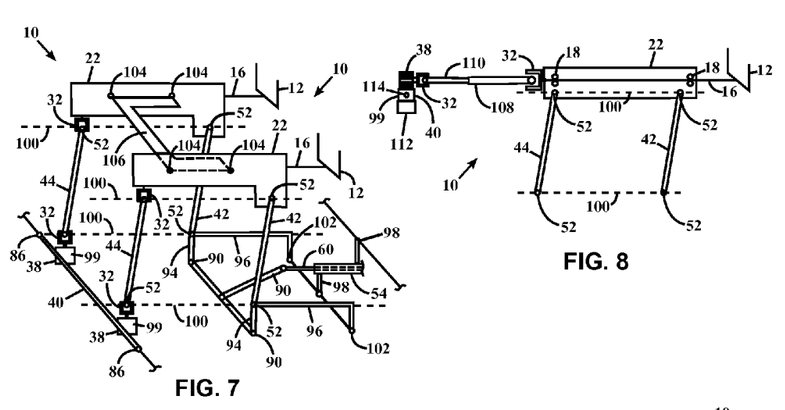
FIG. 7 is a graphical side-view depiction of a dual control arrangement wherein two four-bar vehicle control assemblies are coupled together in a manner providing a duplicating of control inputs and outputs.
FIG. 8 is a graphical side-view depiction of a forward upper portion of a four-bar vehicle control assembly equipped with a forward extending length-adjustable rotatable shaft having a distal end coupled to rotation transmission means.

In operation, pitch control input in FIGS. 5-7 is provided by a forward or aft control input made to yoke 12 and control input shaft 16 rotatably mounted to upper bar member 22. For example a forward movement or down elevator control input causes upper bar member to move forward correspondingly positioning the upper ends of forward and aft upwardly extending bar members 44 and 42 to also move forward, which in turn causes a pitch control transfer arm 94 to pivot rearward (around the proximate pivot 52). As arm 94 is positioned rearward, pitch control couplings 90 transmit the rearward movement to a forward end of an elevator control linkage member, such as an elevator control tube mechanically linked to an elevator (e.g., an elevator control arm or horn). Alternatively control transfer arm 94 may be removed and a pitch control coupling made at a lower portion of bar member 42 (above lower pivot 52) and a forward end of a pitch control member (e.g., 60).

To impart roll control input, an operator laterally positions yoke 12 and attached rotatable control input shaft 16. For example, to impart a left-roll input the operator positions the yoke and attached shaft laterally to his left, which in turn causes bar members 44 and 42 and aileron control linkage 116 to pivot at lower pivot points 52 (aligned with lower axis 100). The aileron control linkage may include a rotatably mounted aileron control input tube 96 (FIG. 6) for example configured with a control arm or horn 98. FIG. 5 further illustrates an option to include a two-axes locking mechanism whereby an operator can selectively lock roll and pitch input and output. For example, a two-axis lock aperture 134 (or threaded aperture) can be provided which is configured to receive a two-axis lock pin 136 (or screw or bolt). In operation, for example in a ground-based vehicle operating mode, or when wanting to lock aircraft movable surfaces in a parked position, a user aligns the lock apertures 134 located at least on the elevator and aileron tubes, and optionally including an aperture located on the vehicle (not shown), and inserts a lock pin 136 (or other fastening means such as a screw or bolt in a threaded aperture) through the apertures, leaving only a third axis of control, namely yaw or steering control input available.

In reference to FIG. 6, a forward portion of a four-bar vehicle control assembly (similar to FIG. 5) is shown also incorporating a rotatable upwardly extending front bar member 44 (having an upper and lower universal joint 32) as one of the four bars of the four-bar assembly, with both upwardly extending members (44 and 42) having a forward-leaning orientation determined by a shaft angle adjustment bracket 122 equipped with an adjustment bracket coupler 124 configured to retain e.g., at a <180 degree angle 120 setting or optionally equipped to provide one or more >180 degree settings. As previously noted the arrangement depicted in FIG. 6 can be configured such that an operator is provided a visual cue, wherein a 'down' elevator control input is achieved as the yoke is moved forward and seen to visibly be moved on a slightly 'downward' path; and, conversely, such that 'up' elevator control input is achieved as the yoke is moved rearward and seen to visibly be moved on a slightly 'upward' path.

It is noted that other rotation transmission means are alternatively employable, for example, the four-bar vehicle control assembly can be equipped to transmit input made to a control input shaft rotatably mounted to an upper bar of the assembly via rotation means employing push-pull type cables in flexible housings. For example, a rotatably mounted upper drum and a rotatably mounted lower drum and one or more flexible cables operatively connected to the drums can be provided, wherein rotational control input received by the upper drum is transmitted via the flexible cable(s) to the lower drum which is further configured to output yaw control, or steering control, or both.

In FIG. 7 a graphical side-view depiction of a dual control arrangement is shown wherein two four-bar vehicle control assemblies (configured similarly to those depicted in FIGS. 5 and 6) are coupled together in a manner providing a duplicating of control inputs and outputs. For example, pitch control input initiated at either yoke 12, can be transmitted to pitch control transfer arm 94 and pitch control couplings 90 to an elevator tube 60 (or other pitch control linkage). Yaw or steering control input, or both, initiated at either yoke 12, can be transmitted via rotatable front upwardly extending members 44 to respective rotation transmission means 99 rotatable pinion gears configured to engage and interact with a rack 40 (e.g., a shared rack 40). Roll control input is managed in a manner similar to the inputting of roll control as specified in the descriptions pertaining to FIGS. 5 and 6. The two controls may be evenly spaced apart from one another by a coupler 106 e.g., equipped on at least one side with two ball joints 104 and an opposite side of the coupler having at least one ball joint 104. Alternatively, one or more couplings made below lower shared axis 100 may be employed to provide a fixed spacing between the two controls. Alternatively, both shafts could be equipped to support opposite ends of a transversely orientated spacing bar or member, and also each be equipped with a sprocket having a continuous loop of chain around the sprockets, whereby, a rotating of one yoke 12 causes a similar rotating of the other, and only one forward bar member 44 need be rotatable having a respective lower rotation transmission means 99.

Alternatively, the two planar four-bar assemblies depicted in FIG. 7 may be evenly spaced closer to one another to be comfortably situated between two operators, while also being spaced sufficiently apart to provide a full range of roll inputs in an unimpeded manner. For example, member 106 can be modified to be mounted on upper bar members 22 and extend outward laterally as a transverse member having a width wide enough to provide a mounting of two yokes in a suitable laterally spaced manner for each to be located in front of one of the two operators. The upper ends of the two aft upwardly extending bar members 42 are also modified to replace each pivot 52 with a universal joint or ball joint whereby the upper bar members 22 will be maintained in a vertical orientation throughout a full range of roll control inputs, which in turn will keep the attached laterally extended transverse member 106 in a horizontal orientation. Thus configured a "T" type of control arrangement is provided (as seen from the front of the four-bar assembly) wherein the transverse member forms the top of the T and the closely aligned upwardly extending bar members form the base of the T.

In reference to FIG. 8, a forward rotatable member having an adjustable length is provided that may be configured similar to the forward rotatable bar member depicted in FIG. 1 or be equipped with a ball-spline arrangement (e.g., having length adjusting rotatable member. 108 with an interior rotatable member 110 slidably positionable therein). In either case, a length adjusting rotatable member is provided which accommodates a full range of forward and aft pitch control and side to side roll control inputs by being equipped at both ends with universal joints 32 (or constant velocity joints, also known as CV joints). As depicted in FIG. 8 the distal end of the forward facing rotatable member is equipped with rotation transmission means 99 for example comprising a pinion gear 38 and a rack 40, with the latter is slidably positionable in a rack mount 112, to impart yaw and/or steering control output to yaw/steering control linkage coupling 114. Alternatively other rotation transmission means 99 are employable, for example a distal end of a universal joint 32 attached to a forward end of rotatable member 110 can be equipped with an outwardly extending control arm or horn providing coupling to yaw and/or steering control linkage 114, and so forth.

Figure 9:
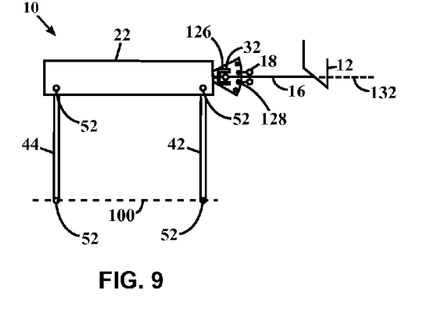
FIGS. 9 and 10 are graphical side-view depictions of an upper portion of a four-bar vehicle control assembly equipped to adjust the inclination of a control input shaft (FIG. 9) or upper bar member (FIG. 10) and in the latter case to switch between parallelogram and trapezoidal four-bar configurations.
Figure 10:
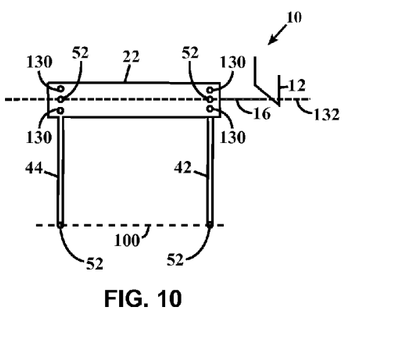

In reference to FIGS. 9 and 10 two graphical side-view depictions of an upper portion of a four-bar vehicle control assembly are provided wherein the inclination of a control input shaft is configured adjustable in FIG. 9, and an upper bar member 22 is configured adjustable in FIG. 10, and in the latter case equipped to switch between parallelogram and trapezoidal four-bar configurations. In FIG. 9 an input shaft angle adjustment bracket 126 is equipped with mounting means, for example a series of apertures sized to mount a bearing coupler 128 (in two of the apertures). Accordingly when moved to higher apertures, the inclination of control input shaft 16 will be raised, and conversely when moved to lower apertures, the inclination of control input shaft 16 will be lowered.

In FIG. 10, a forward portion or rearward portion, or both, of an upper bar member 22 (or assembly) may be equipped with a plurality of vertically spaced apertures each sized to slidably receive a securely retainable set pin or keeper pin (or other fastening means) alignable with and insertable into a height adjustment aperture 130 and tranversely insertable through an aperture located in an upper portion of aft bar member 42 (and/or forward bar member 44). Alternatively or additionally, both vertical bars (44 and 42) may each be equipped with a plurality of height adjusting apertures which provides the option to change the height of the front and/or rear of upper bar horizontal member 22 or assembly. In each case, the rotatable control input shaft 16 is made adjustable to and securely retainable at one of a plurality of predetermined inclinations and/or or heights e.g., depending on which vertical bar aperture is aligned with an aperture of the upper bar horizontal member 22 or assembly in which the set pin or keeper pin is securely inserted.

It is noted that while such control yoke/steering wheel height adjusting and retaining means are described herein as a set or keeper pin securable in one or more apertures, that any one or more among a variety of other adjustable height retaining means may alternatively be employed to secure a pivotable upper bar member or assembly at a given height, including, but limited to, one or more among the following: pegs, clamps, clasps, latches, ties, retaining bands, cords, hook and loop material or fasteners, hooped material, and the like.

Figure 11:
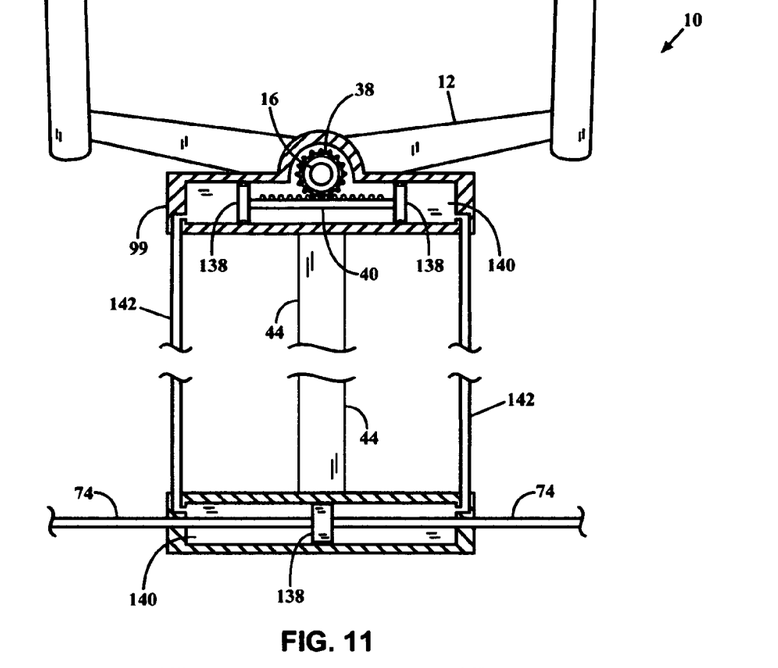
FIG. 11 is front view of a four-bar vehicle control assembly depicting hydraulic rotation transmission means, shown in cross-section.

In reference to FIG. 11, a front view of a four-bar vehicle control assembly is depicted equipped with hydraulic rotation transmission means 99 attached to an upper bar member of the assembly and shown in cross-section, wherein a yoke/steering wheel 12 is configured to impart rotation to control input shaft 16 having a pinion gear 38 mounted to a distal end of the shaft. The rotating of the pinion gear 38 causes a linear positioning of a rack 40 and a hydraulic piston 138 mounted to each end of the rack to slidably position within a hydraulic cylinder 140, which in turn causes a corresponding conveyance of hydraulic fluid through one or more hydraulic conduits 142, such as hydraulic flexible hosing, tubing or pipe. The conduit conveys the hydraulic fluid into a lower hydraulic cylinder 140 which in turn causes a slidable positioning of a hydraulic piston 138 and a corresponding positioning of connected yaw, and/or steering linkage, such as a push rod or push-pull rod 74. A portion of the forward bar member 44 is shown between the hydraulic conduits 142.

Figure 12:
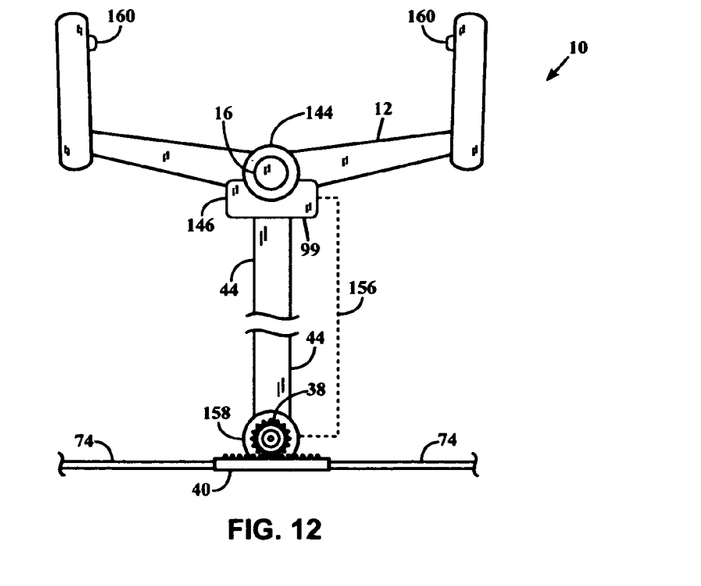
FIG. 12 is front view of a four-bar vehicle control assembly depicting a fly-by-wire arrangement equipped to transmit monitored rotational inputs to rotation transmission means.

FIG. 12 is front view of a four-bar vehicle control assembly depicting an example of how an axis of control can be configured with a fly-by-wire arrangement equipped to transmit monitored rotational inputs made by an operator to a yoke/steering wheel to rotation transmission means 99. In operation, an operator imparts a rotation control input to yoke 12 and the attached control input shaft 16, and rotation monitoring means 144 is configured to monitor the rotation and convey the degree of monitored rotation to a rotation controller 146 (e.g., micro-controller or processor equipped) which is configured to transmit control signal via suitable electrical conduit 156 to rotation transmission means, such as a stepper motor 158 shown configured to control the rotation of a pinion gear 38 engaging a rack 40 connected to yaw and/or steering linkage, such as a push rod or push-pull rod 74.

It is noted that while the example depicted in FIG. 12 pertains to a fly-by-wire arrangement directed to yaw and/or steering control, that alternatively or additionally one or more other monitoring means are configurable, for example, to monitor pitch or roll control inputs (or both) and to convey the degree of monitored input to a rotation transmission means controller (e.g., micro-controller or processor equipped) configured to transmit control signal via suitable electrical conduit to suitable rotation transmission means configured to impart pitch or roll control outputs (or both).

Optionally or additionally, one or more control input means 160 for controlling any one or more of the aforementioned additional or auxiliary controls or controllers can be mounted to or near a control input means (e.g., yoke/steering wheel 12) and located in an easily accessible position.

Although the present invention and its advantages have been described in detail, those skilled in the art should understand that they can make various changes, substitutions and alterations herein without departing from the spirit and scope of the invention in its broadest form.

The invention claimed is:

1. A four-bar vehicle control providing up to three independent or combined axes of control input, comprising:
 a four-bar assembly comprising: i) an upper first bar member having a first rotatable forward pivot coupling and a first aft pivot coupling, the first forward and aft pivot couplings being coupled to opposite ends of the first bar member, wherein the first rotatable forward pivot coupling is configured to provide two degrees of freedom; ii) a forward upwardly-extending second bar member, wherein the first rotatable forward pivot coupling is coupled to an upper portion of the forward upwardly-extending second bar member; iii) a rearward upwardly-extending third bar member, wherein the first aft pivot coupling is coupled to an upper portion of the rearward upwardly-extending third bar member; and iv) a second rotatable forward pivot coupling and a second aft pivot coupling establishing end locations of a lower fourth bar, wherein the second rotatable forward pivot coupling is coupled to a lower portion of the second bar member, and the second aft pivot coupling is coupled to a lower portion of the third bar member; and wherein the second rotatable forward pivot coupling is configured to provide two degrees of freedom;
 a pivotally mounted linkage member coupled to the second aft pivot coupling, wherein the pivotally mounted linkage member, the second rotatable forward pivot coupling and the second aft pivot coupling are aligned on an axis; wherein the pivotally mounted linkage member and the second rotatable forward pivot coupling with two degrees of freedom enable the four-bar assembly to rotate about the axis of the pivotally mounted linkage member;
 a control input shaft rotatably mounted to and generally parallel to the upper first bar member, with an aft portion of the control input shaft extending rearward beyond the first bar member and equipped with an operator control input selected from the group consisting of a yoke, steering wheel and one or more control input handles, the operator control input being configured to receive said up to three independent or combined axes of control inputs;

an upper transmission element that rotatably couples the control input shaft and the first rotatable forward pivot coupling, wherein rotational control input made to the aft portion of the control input shaft is transmitted to the second bar member via the first rotatable forward pivot coupling;

a lower transmission element rotatably coupled to the rotatable second bar member via the second rotatable forward pivot coupling, the lower transmission element enabling the rotational input to be transmitted to an element selected from the group consisting of a movable surface for yaw axis control, and a steerable component for steering control;

wherein the pivotally mounted linkage member is coupled to a lower portion of the four-bar assembly to transmit lateral, roll input made to the aft end of the control input shaft to a movable surface that provides roll axis control; and, a pitch control linkage coupled to the lower portion of the upwardly-extending third bar member such that the coupling of the pitch control linkage to the third bar member is configured to transmit forward or aft input made to the aft end of the elongated control input shaft to a movable surface that provides pitch axis control.

2. The four-bar vehicle control of claim 1 wherein the first upper bar member comprises a height adjusting feature configured to selectively adjust the height of an end the first upper bar member.

3. The four-bar vehicle control of claim 1 wherein a lower portion of the second bar member or a lower portion of the third bar member is configured with a formed angle, or with a selectively adjustable angle adjustment element.

4. The four-bar vehicle control of claim 1 wherein the second bar member and the third bar member are opposite each other, and the first bar member and the fourth bar are opposite each other; and wherein bar members that are opposite each other in the four-bar assembly are configured or are adjustably configurable to have different lengths from each other.

5. The four-bar vehicle control of claim 1 further comprising an input shaft inclination adjustment bracket configured to rotatably mount said rotatable control input shaft to the first bar member at one of a plurality of inclination angles.

6. The four-bar vehicle control of claim 1 wherein the aft end portion of said rotatable control input shaft further comprises a hub for mounting said operator control input;
wherein the control input shaft comprises a plurality of shaft apertures spaced apart longitudinally along, and extending transversely through, the shaft; wherein the hub comprises at least one hub aperture extending transversely through the hub, wherein an aligning of the hub aperture with one of the plurality of shaft apertures provides for the inserting of a fastener to selectively position the operator control input longitudinally on the shaft.

7. The four-bar vehicle control of claim 1 further comprising a controller mounted on or near the operator control input, wherein the controller is configured to be responsive to control input made by an operator.

8. The four-bar vehicle control of claim 1 further comprising:
a first aperture extending transversely through the pivotally mounted linkage member;
a second aperture extending transversely through the pitch control linkage; and
a quick locking element configured to be removably insertable and securable in at least both first and second apertures for selectively disabling or enabling roll and pitch control input.

9. The four-bar vehicle control of claim 1 wherein the four-bar vehicle control is operable in a vehicle equipped to operate in one or more transportation modes.

10. The four-bar vehicle control of claim 1 wherein the vehicle control is configured to be connectable to an input port of a computer, simulator or handheld device, and is operable as a controller providing up to three independent or combined axes of control input.

11. The four-bar vehicle control of claim 1 further comprising:
a dual control arrangement of two four-bar vehicle controls operably mounted side by side; and
a transverse member coupling the upper first bar members of the two four-bar vehicle controls together, the transverse member having a width and a length sufficient to provide a spacing between the two four-bar vehicle controls; wherein the vehicle controls are equipped to provide output to shared control members.

* * * * *